United States Patent
Sjursen et al.

(10) Patent No.: US 11,960,882 B2
(45) Date of Patent: Apr. 16, 2024

(54) FACILITATING GENERATION OF CONTEXTUAL PROFILE DATA

(71) Applicant: MICROSOFT TECHNOLOGY LICENSING, LLC, Redmond, WA (US)

(72) Inventors: Bjarte Sjursen, Troms (NO); Dino Ilic, Oslo (NO); Kennedy Kahiri, Nairobi (KE); Timothy Mwirabua, Nairobi (KE)

(73) Assignee: Microsoft Technology Licensing, LLC, Redmond, WA (US)

( * ) Notice: Subject to any disclaimer, the term of this patent is extended or adjusted under 35 U.S.C. 154(b) by 22 days.

(21) Appl. No.: 17/566,805

(22) Filed: Dec. 31, 2021

(65) Prior Publication Data
US 2023/0214214 A1 Jul. 6, 2023

(51) Int. Cl.
*G06F 8/73* (2018.01)
*G06F 8/71* (2018.01)

(52) U.S. Cl.
CPC . *G06F 8/73* (2013.01); *G06F 8/71* (2013.01)

(58) Field of Classification Search
CPC .................................... G06F 8/73; G06F 8/71
USPC .......................................................... 717/121
See application file for complete search history.

(56) References Cited

U.S. PATENT DOCUMENTS

| 10,802,820 | B2 | 10/2020 | Konik et al. |
| 2008/0005235 | A1 | 1/2008 | Jegde et al. |
| 2009/0276752 | A1 | 11/2009 | Sharma |
| 2018/0129497 | A1* | 5/2018 | Biddle ................ G06F 11/3668 |
| 2020/0364132 | A1* | 11/2020 | Underseth ........... G06F 11/3664 |

FOREIGN PATENT DOCUMENTS

WO 2014093883 A1 6/2014

OTHER PUBLICATIONS

"Collaborate with Live Share", Retrieved From: https://web.archive.org/web/20211029090707/https:/code.visualstudio.com/learn/collaboration/live-share, Oct. 29, 2021, 3 Pages.
"Professional Scrum Development with Microsoft Visual Studio 2012: Effective Collaboration", Retrieved From: https://www.microsoftpressstore.com/articles/article.aspx?p=2224378&seqNum=2, Oct. 15, 2012, 7 Pages.
"Visual Expert", Retrieved From: https://web.archive.org/web/20210514054431/https:/www.visual-expert.com/, May 14, 2021, 4 Pages.

(Continued)

*Primary Examiner* — John Q Chavis
(74) *Attorney, Agent, or Firm* — Holzer Patel Drennan

(57) ABSTRACT

Methods, computer systems, computer-storage media, and graphical user interfaces are provided for providing contextual profile data related to code. In embodiments, a contextual indicator indicating at least a portion of code accessed at a user device and/or a developer associated with the at least the portion of code is obtained. Based on the contextual indicator, contextual profile data related to the code and/or the developer is determined by communicating, via a network, with a remote server having a global repository including the at least the portion of code. Thereafter, the contextual profile data is provided for display in a profile card associated with the developer.

18 Claims, 10 Drawing Sheets

(56) References Cited

OTHER PUBLICATIONS

"Work on Big Ideas, without the Busywork", Retrieved From: https://web.archive.org/web/20211106142233/https://asana.com/, Nov. 6, 2021, 6 Pages.

Daityari, Shaumik, "12 Best Code Review Tools for Developers (2021 Edition)", Retrieved From: https://kinsta.com/blog/code-review-tools/, Mar. 19, 2021, 27 Pages.

"International Search Report and Written Opinion Issued in PCT Application No. PCT/US22/048903", dated Feb. 16, 2023, 11 Pages.

* cited by examiner repository > packages > package-name  📄 index.html > ◈html > ◈head You, 29 minutes ago | 4 authors (John Smith ⚡ and others)

```
 1   <!DOCTYPE html>
 2   <html dir="ltr" lang="en">
 3   <head>
 4     <title>LivePersonaCard test page</title>
 5     <link rel="shortcut icon" href="App/favicon.ico" />
 6     <meta name="viewport" content="width=device-width,initial-scale=1" />
 7   </head>
 8   <body>
 9     <div id="root"></div>
10     <script src="/assets/testpage.js"></script>
11   </body>
12   </html>
13
14
```

Reach jsmith@email.com

FACILITATING GENERATION OF CONTEXTUAL PROFILE DATA

BACKGROUND

Code development is an important aspect for many organizations. Collaboration in performing code development has become more prevalent. As such, it has become increasingly desirable in many cases for a viewer of code (e.g., a programmer, manager, tester) to understand the history and progression of the code and/or to understand what aspects of code a programmer has contributed to or worked on over a period of time. Manually reviewing such code aspects and communicating with developers can be tedious and time consuming. For example, a user may need to access various services to identify the desired information, including communication services to communicate with a developer, remote services that host a remote or global code repository to identify information associated with master code, etc. In addition to such manual tracking of information being tedious and time-consuming, such a manual process also requires and consumes computing resources to navigate the systems and identify the desired information.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, facilitating generation of contextual profile data. In this regard, contextual profile data associated with code can be determined and provided in an accurate and efficient manner. Contextual profile data generally refers to data or information related to an entity (e.g., an individual, such as a developer) based on context associated with the entity. Such contextual profile data is generally related to code, a code segment, and/or a developer associated therewith. Advantageously, providing the contextual profile data in an efficient manner enables a user viewing or developing code to have a more clear view into developments of the code and/or work associated with the developer without having to manually track down the desired data using various systems and queries thereto. Further, a user may efficiently initiate communication with a developer to communicate, for example, in regard to code development. A more efficient and effective manner of providing data related to code (e.g., within the context of a code development application) generates a more user-friendly experience. In particular, a user is not required to manually search for desired information via other resources, thereby resulting in less utilization of computing device resources. Accordingly, embodiments of the present technology are directed to facilitating generation of contextual profile data. In this regard, contextual profile data associated with code can be determined and provided in an accurate and efficient manner. Contextual profile data generally refers to data or information related to an entity (e.g., an individual, such as a developer) based on context associated with the entity. Generally, in accordance with embodiments described herein, contextual profile data is related to code, a code segment, and/or a developer associated therewith. Advantageously, providing the contextual profile data in an efficient manner enables a user viewing or developing code to have a more clear view into developments of the code and/or work associated with the developer without having to manually track down the desired data using various systems and queries thereto. Further, a user may efficiently initiate communication with a developer to communicate, for example, in regard to code development. A more efficient and effective manner of providing data related to code (e.g., within the context of a code development application) generates a more user-friendly experience. In particular, a user is not required to manually search for desired information via other resources, thereby resulting in less utilization of computing device resources. Tailoring desired contextual profile data in relation to code, or portions thereof, enables users to view relevant data relevant in an efficient and accurate manner.

BRIEF DESCRIPTION OF THE DRAWINGS

The technology described herein is described in detail below with reference to the attached drawing figures, wherein:

FIG. 3 provides a graphical user interface including example source code, in accordance with embodiments of the present technology;

FIG. 5 provides a graphical user interface including various contextual profile data in association with an example profile card, in accordance with embodiments of the present technology;

DETAILED DESCRIPTION

Figure 1:
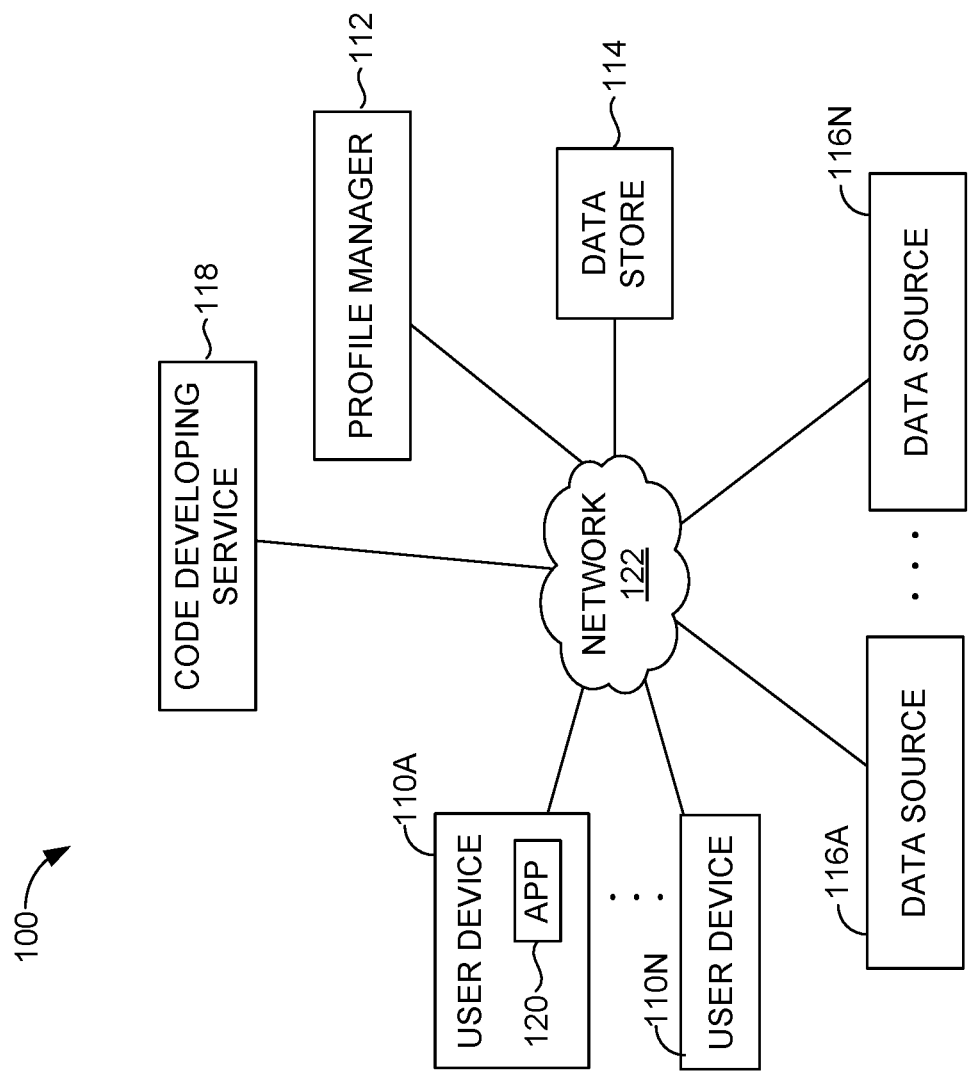
FIG. 1 is a block diagram of an exemplary system for facilitating provision of contextual profile data, suitable for use in implementing aspects of the technology described herein.

The technology described herein is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

Overview

Code development is an important aspect for many organizations. Oftentimes, many individuals collaborate on code development in an effort to more quickly produce code and/or to produce more effective code. With multiple developers contributing to code, it may be difficult to understand the history and progression of the code. For example, to understand why or when code modifications were made or who made a code modification, an individual may need to manually review various aspects of the code and even communicate with various developers to understand aspects of the code. Further, to understand what aspects a programmer has contributed to, an individual may need to manually review various data and/or communicate with the programmer. Manually reviewing such code aspects and communicating with developers can be tedious and time consuming. For example, a user may need to access various services to identify the desired information, including communication services to communicate with a developer, remote services that host a remote or global code repository to identify information associated with master code, etc. In addition to such manual tracking of information being tedious and time-consuming, such a manual process also requires and consumes computing resources to navigate the systems and identify the desired information.

Accordingly, embodiments of the present technology are directed to facilitating generation of contextual profile data. In this regard, contextual profile data associated with code can be determined and provided in an accurate and efficient manner. Contextual profile data generally refers to data or information related to an entity (e.g., an individual, such as a developer) based on context associated with the entity. Generally, in accordance with embodiments described herein, contextual profile data is related to code, a code segment, and/or a developer associated therewith. Advantageously, providing the contextual profile data in an efficient manner enables a user viewing or developing code to have a more clear view into developments of the code and/or work associated with the developer without having to manually track down the desired data using various systems and queries thereto. Further, a user may efficiently initiate communication with a developer to communicate, for example, in regard to code development. A more efficient and effective manner of providing data related to code (e.g., within the context of a code development application) generates a more user-friendly experience. In particular, a user is not required to manually search for desired information via other resources, thereby resulting in less utilization of computing device resources.

In operation, to efficiently and effectively determine and provide contextual profile data, embodiments described herein can automatically determine contextual profile data associated with code and/or a developer associated therewith in response to obtaining a contextual indicator(s), such as an indication of the code, a code segment, and/or a code developer. That is, based on obtaining an indication of code, a code segment, and/or a code developer, contextual profile data related thereto can be determined and provided to a user viewing code. In this way, in cases in which a user is viewing code being developed, the user can efficiently and effectively be provided with contextual profile data that provides details or information as to the development of the code. A code developer is generally used herein in a broad sense to include any individual that contributes to or views code, such as a programmer, a manager, a tester, etc. Code may be any type of code used to develop computer programs, such as websites, web applications, web services, mobile applications, etc.

Such contextual profile data may include various types of code-related information, including designated response data, repository data, pull request data, push/pull command data, code modification data, and/or visual work item data. Each of such data can provide context or information to a viewer of code that the user may otherwise need to manually find (e.g., via accessing various services). Advantageously, embodiments described herein can communicate with remote data sources that manage coding collaboration to facilitate determining such contextual profile data, thereby providing rich contextual data in a real-time or up-to-date manner (that is, not static user device information).

The contextual profile data may be provided for display in any number of formats, including a profile card. A profile card may present contextual profile data as well as other data, such as user data, organizational data, etc. In this regard, when a user selects a code portion associated with a developer, or selects the developer, a profile card associated with the developer may be presented that includes contextual profile data, user data, organizational data, and/or other types of data. Further, the profile card may include icons that, if selected, initiate communication with the developer such that the user can efficiently initiate communication with the developer without needing to access a separate application to initiate communication with the developer.

Overview of Exemplary Environments for Facilitating Generation of Contextual Profile Data Referring initially to FIG. 1, a block diagram of an exemplary network environment 100 suitable for use in implementing embodiments described herein is shown. Generally, the system 100 illustrates an environment suitable for facilitating generation of contextual profile data. Among other things, embodiments described herein efficiently provide context-aware profile data in association with a code development tool. Generally, profile data refers to data or information related to an entity, such as an individual. Contextual profile data generally refers to data or information related to an entity (e.g., an individual) based on context associated with the entity. Generally, in accordance with embodiments described herein, contextual profile data is related to code, a code segment, and/or a developer associated therewith. Advantageously, providing the contextual profile data in an efficient manner enables a user viewing or developing code to have a more clear view into developments of the code and/or work associated with the developer without having to manually track down the desired data using various systems and queries thereto.

The network environment 100 includes a user device 110a-110n (referred to generally as user device(s) 110), a profile manager 112, a data store 114, data sources 116a-116n (referred to generally as data source(s) 116), and a code developing service 118. The user device 110a-110n, the profile manager 112, the data store 114, the data sources 116a-116n, and the code developing service 118 can communicate through a network 122, which may include any number of networks such as, for example, a local area network (LAN), a wide area network (WAN), the Internet, a cellular network, a peer-to-peer (P2P) network, a mobile network, or a combination of networks.

The network environment 100 shown in FIG. 1 is an example of one suitable network environment and is not intended to suggest any limitation as to the scope of use or functionality of embodiments disclosed throughout this document. Neither should the exemplary network environment 100 be interpreted as having any dependency or requirement related to any single component or combination of components illustrated therein. For example, the user device 110a-110n and data sources 116a-116n may be in communication with the profile manager 112 via a mobile network or the Internet, and the profile manager 112 may be in communication with data store 114 via a local area network. Further, although the environment 100 is illustrated with a network, one or more of the components may directly communicate with one another, for example, via HDMI (high-definition multimedia interface), and DVI (digital visual interface). Alternatively, one or more components may be integrated with one another, for example, at least a portion of the profile manager 112 and/or data store 114 may be integrated with the user device 110 and/or code developing service 118. For instance, a portion of the profile manager 112 may be integrated with a server (e.g., code developing service) in communication with a user device, while another portion of the profile manager 112 may be integrated with the user device (e.g., via application 120).

The user device 110 can be any kind of computing device capable of facilitating determining and/or providing contextual profile data. For example, in an embodiment, the user device 110 can be a computing device such as computing device 1000, as described above with reference to FIG. 10. In embodiments, the user device 110 can be a personal computer (PC), a laptop computer, a workstation, a mobile computing device, a PDA, a cell phone, or the like.

The user device can include one or more processors, and one or more computer-readable media. The computer-readable media may include computer-readable instructions executable by the one or more processors. The instructions may be embodied by one or more applications, such as application 120 shown in FIG. 1. The application(s) may generally be any application capable of facilitating determining and/or providing contextual profile data. In some implementations, the application(s) comprises a web application, which can run in a web browser, and could be hosted at least partially server-side (e.g., via code editing service 118). In addition, or instead, the application(s) can comprise a dedicated application. In some cases, the application is integrated into the operating system (e.g., as a service). As one specific example application, application 120 may be a code developing tool or other integrated development tool that provides various tools for computer programmers for software development, such source code development or editing, build automation tools, debugging tools, etc.

User device 110 can be a client device on a client-side of operating environment 100, while profile manager 112 and/or code developing service 118 can be on a server-side of operating environment 100. Profile manager 112 and/or code developing service 118 may comprise server-side software designed to work in conjunction with client-side software on user device 110 so as to implement any combination of the features and functionalities discussed in the present disclosure. An example of such client-side software is application 120 on user device 110. This division of operating environment 100 is provided to illustrate one example of a suitable environment, and it is noted there is no requirement for each implementation that any combination of user device 110, profile manager 112, and/or code developing service 118 to remain as separate entities.

In an embodiment, the user device 110 is separate and distinct from the profile manager 112, the data store 114, the data sources 116, and the code developing service 118 illustrated in FIG. 1. In another embodiment, the user device 110 is integrated with one or more illustrated components. For instance, the user device 110 may incorporate functionality described in relation to the profile manager 112 or code developing service 118. For clarity of explanation, embodiments are described herein in which the user device 110, the profile manager 112, the data store 114, the data sources 116, and the code developing service 118 are separate, while understanding that this may not be the case in various configurations contemplated.

As described, a user device, such as user device 110, can facilitate determining and/or providing contextual profile data. Profile data is broadly used herein and may refer to any data associated with an entity, such as an individual. Contextual profile data generally refers to data or information related to an entity (e.g., an individual) based on context associated with the entity. In embodiments, contextual profile data refers to information or data associated with code, or a portion thereof. For instance, contextual profile data can refer to data associated with code, a code portion, and/or a code developer.

A user device 110, as described herein, is generally operated by an individual or entity interested in developing code. In some cases, such an individual may be a contributor or programmer of code. In other cases, a user may be a programmer, a tester, or any individual viewing or contributing to code in some way. In some cases, determination or provision of contextual profile data may be initiated at the user device 110. For example, in some cases, a user may select to determine or view contextual profile data related to code. As can be appreciated, in some cases, a user of the user device 110 that may initiate determining and/or providing of contextual profile data is a user that performs some aspect of code development (e.g. programmer, manager, tester, etc.).

Determining and/or providing contextual profile data may be initiated and/or presented via an application 120 operating on the user device 110. In this regard, the user device 110, via an application 120, might allow a user to initiate a determination or presentation of contextual profile data. The user device 110 can include any type of application and may be a stand-alone application, a mobile application, a web application, or the like. In some cases, the functionality described herein may be integrated directly with an application or may be an add-on, or plug-in, to an application. One example of an application that may be used to initiate and/or present contextual profile data in a code developing environment is Visual Studio® Code provided by Microsoft®.

Such determination and/or provision of contextual profile data may be initiated at the user device 110 in any manner. For instance, upon accessing a particular application (e.g., a code developing application), a user may be presented with, or navigate to, options associated with contextual profile data, such as contextual profile data related to code, or a portion thereof. As one example, a user may utilize the user device 110 to access code via a repository. In association with a portion of the code (e.g., a line of the code), a user may select to view contextual profile data. For instance, a user may right click or hover over a portion of code and be presented with an option to view contextual profile data. In some cases, the user may select to view a profile card corresponding with an individual associated with the code, or portion thereof. For example, a user may hover over a code segment (e.g., a line of code), resulting in a profile indicator being presented in association with the code segment. A profile indicator may be in any form, such as a command including an indicator of a particular individual associated with the code segment. For instance, the profile indicator may include an email address or name of an individual that provided a most recent commit order in association with the code segment. Selecting the profile indicator, or portion thereof, can result in contextual profile data being presented via a display screen of the user device 110. As described herein, the contextual profile data may be presented to a user in the form of a profile card.

The user device 110 can communicate with the profile manager 112 to initiate determination of contextual profile data and/or obtain contextual profile data. In embodiments, for example, a user may utilize the user device 110 to initiate a determination of contextual profile data via the network 122. For instance, in some embodiments, the network 122 might be the Internet, and the user device 110 interacts with the profile manager 112 (e.g., directly or via code developing service 118) to initiate generation of contextual profile data. In other embodiments, for example, the network 122 might be an enterprise network associated with an organization. It should be apparent to those having skill in the relevant arts that any number of other implementation scenarios may be possible as well.

With continued reference to FIG. 1, the profile manager 112 can be implemented as server systems, program modules, virtual machines, components of a server or servers, networks, and the like. At a high level, the profile manager 112 manages profile data, including contextual profile data related to code. In particular, the profile manager 112 can obtain contextual indicators, such as contextual indicators from user device 110. Using the contextual indicators, the profile manager 112 can determine contextual profile data, for example, using data sources 116. Data sources 116a-116n may be any type of source containing data. Generally, the profile manager 112 can determine contextual profile data using any number of devices. As such, the profile manager 112 can determine contextual profile data using various sources, such as data sources 116a-116n and data store 114. In this regard, the profile manager 112 can retrieve or receive data collected or identified at various components, or sensors associated therewith.

As described, in some cases, the profile manager 112 can receive contextual indicators for determining contextual profile data via the user device 110 (or other device). Contextual indicators generally refer to any data that can provide context as to data to provide to a user. Contextual indicators received from a device, such as user device 110, can include data that was manually or explicitly input by the user (input queries or selections) as well as indicators that were automatically generated. By way of example only, contextual indicators may include a code indicator indicating a particular code file, a code segment indicator indicating a segment or portion of code (e.g., a line of code selected by a user), a code developer indicator indicating an individual associated with the code development (e.g., an individual providing a most recent submit order associated with the code, or code segment), a date and/or time associated with code (e.g., a time of a submit order, a time of a most recent modification, etc.), and/or the like.

The profile manager 112 can receive contextual indicators from any number of devices, but generally obtains one or more contextual indicators from the user device on which contextual profile data is to be presented. In accordance with receiving a contextual indicator(s) (e.g., via the user device 110), the profile manager 112 can use the contextual indicator to determine contextual profile data in relation to the contextual indicator. In this regard, the profile manager 112 determines contextual profile data related to the contextual indicator(s). Such contextual profile data may be in any number of forms, but is generally related to code, a code segment, or a developer associated therewith. As described herein, the contextual profile data may include designated response data, repository data, pull request data, push/pull command data, code modification data, visual work item data, and/or the like.

To determine such data, in some embodiments, the profile manager 112 communicates with a data source(s), such as data source 116. In some cases, contextual profile data can be determined via a remote data source having remote or centralized information related to various coding projects. In this regard, the profile manager 112 may access or make a call to a cloud computing service that monitors or provides application management. One example service is Microsoft's Azure® DevOps service that can monitor application management. Such communication with a remote service that performs application management may be via an Open Supervised Device Protocol (OSDP) or other protocol enabling communication over a network. Data source 116 may additionally or alternatively be external or third-party services, servers, data stores, or other components having data associated with code or developers.

In accordance with determining contextual profile data, such data can be provided for example, to user device 110 for display to a user (e.g., via application 120). The contextual profile data may be provided in any number of ways. In some embodiments, the contextual profile data is provided in the form of a profile card. As can be appreciated, a profile card may present other information such as user information, organization information, etc. Advantageously the profile card can also enable a user to initiate communication with the entity (e.g., individual) associated with the profile card. For example, assume a profile card is presented in association with developer A. In such a case, a user can select various communication controls via the profile card to communicate with developer A. For instance, a user may select to email developer A, initiate a web-based chat with developer A, initiate a video call with developer A, etc. In other cases, such contextual profile data may be provided to another component, such as code developing service 118, for using or providing the contextual profile data to the user device 110.

The code developing service 118 may be any type of server or service that can facilitate code development. One example code development service 118 includes an integrated development environment such as Visual Studio® Code, by Microsoft®, that can be used to develop computer programs, websites, web apps, web services, mobile apps, etc. Such code developing service 118 may communication with application 120 operating on user device 110 to provide back-end services to application 120. Although code developing service 118 is shown separate from the profile manager 112, as can be appreciated, the profile manager 112 can be integrated with the code developing service 118, or other service or service. The user device 110 can present received data or information in any number of ways, and is not intended to be limited herein. As an example, contextual profile data can be presented in the form of a profile card concurrently with code presented via application 120.

Advantageously, utilizing implementations described herein enable generation of contextual profile data related to code to be performed in an efficient manner. Further, the generated contextual profile data can dynamically adapt to align with information determined as desired by the user and/or in real-time to the user. As such, a user can view desired and up-to-date information and can seamlessly assess the information.

Figure 2:
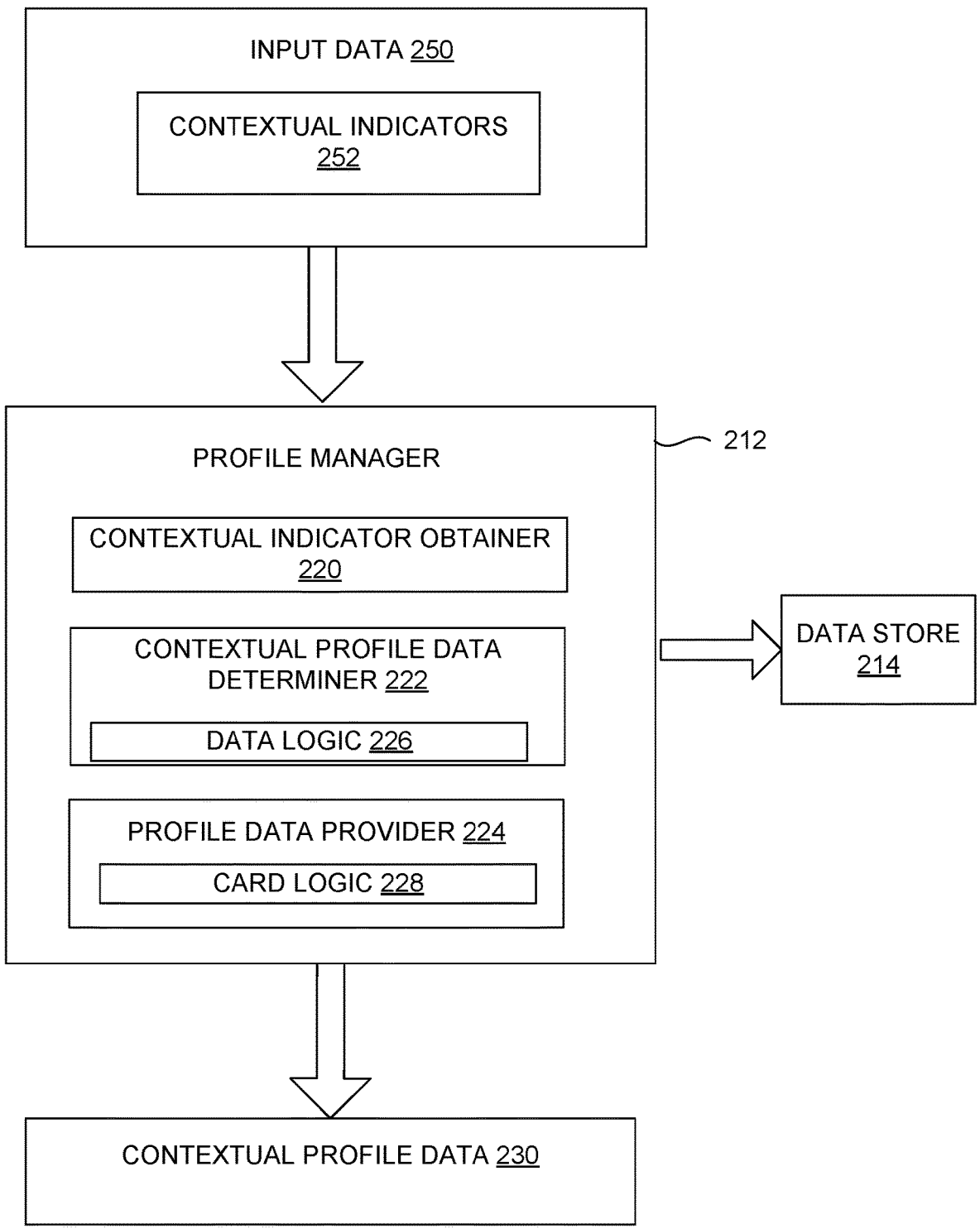
FIG. 2 is an example an example implementation for facilitating provision of contextual profile data, via a profile manager, in accordance with aspects of the technology described herein.

Turning now to FIG. 2, FIG. 2 illustrates an example implementation for providing contextual profile data, via profile manager 212. The profile manager 212 can communicate with the data store 214. The data store 214 is configured to store various types of information accessible by the profile manager 212 or other server. In embodiments, data sources (such as data sources 116 of FIG. 1), user devices (such as user devices 110 of FIG. 1), and/or code editing tool 118 of FIG. 1 can provide data to the data store 214 for storage, which may be retrieved or referenced by any such component. As such, the data store 214 may store contextual indicators, contextual profile data, or the like.

In operation, the profile manager 212 is generally configured to manage determination and/or provision of contextual profile data. In embodiments, the profile manager 212 includes a contextual indicator obtainer 220, a profile data determiner 222, and a profile data provider 224. Some embodiments of profile manager 212 may also utilize data logic 226, as described herein. According to embodiments described herein, the profile manager 212 can include any number of other components not illustrated. In some embodiments, one or more of the illustrated components 220, 222, and 224 can be integrated into a single component or can be divided into a number of different components. Components 220, 222, and 224 can be implemented on any number of machines and can be integrated, as desired, with any number of other functionalities or services.

The contextual indicator obtainer 220 can receive or obtain input from various components for utilization in determining contextual profile data. The contextual indicator obtainer 220 can obtain input data 250, which can include contextual indicators 252. Such data can be received from any number of devices or components. For example, a contextual indicator(s) 252 may be received from a user device to which to provide contextual profile data.

As described, contextual indicators may be obtained by the contextual indicator obtainer 220. In this regard, the contextual indicator obtainer 220 may obtain contextual indicators from user devices. Such contextual indicators may indicate context for use in determining contextual profile data. In embodiments, contextual indicators indicate context associated with code being developed or viewed at the user the device. As previously described, contextual indicators may be provided by a user device operated by a user viewing code being developed. Any contextual indicators may be stored, for instance, at data store 214.

Examples of contextual indicators that may be obtained include code indicators, code segment indicators, developer indicators, user indicators, time/date indicators, or the like. A code indicator generally refers to an indication of a particular set of code or computer program. A code segment indicator generally refers to an indication of a particular segment or portion of code (e.g., a line of code). A developer indicator generally refers to an indication of a developer associated with a code or code segment. Such a developer may be an individual that added a code segment, last modified a code segment, provided a most recent submit order, etc. A user indicator generally refers to an individual using, developing, or viewing code (e.g., at a user device). A time/date indicator can refer to a time/date associated with communicating the contextual indicators, a time/date associated with a code modification, etc.

Any number of contextual indicators may be obtained for determining contextual profile data. For example, in some cases, various types of contextual indicators may be provided by a user device to the profile manager 212. In other cases, a particular type of contextual indicator may be provided by a user device to the profile manager. For instance, a code segment indicator and a developer indicator may be provided as a default based on a user selection of a portion of the code.

Although generally described as obtaining contextual indicators provided by a user device, in some cases, a contextual indicator(s) may alternatively or additionally be automatically determined (e.g., by the contextual indicator obtainer 220). For example, a code segment indicator indicating a portion of code selected by a user may be provided by a user device. Based on the code segment indicator, a developer indicator may be determined. For instance, a developer that most recently modified the code segment or that most recently provided a submit order in association with the code segment may be identified.

Such contextual indicators may be obtained in any number of ways. As one example, contextual indicators may be obtained via a request related to viewing contextual profile data or to viewing a profile. In this way, such a request may include any number of contextual indicators.

The contextual profile data determiner 222 is generally configured to determine contextual profile data. As described, contextual profile data can include any type of data that can be presented in association with a profile. In accordance with various embodiments described herein, contextual profile data generally includes data that provides context related to code, or a portion thereof, and/or a developer associated therewith. As previously described, the term developer is used herein broadly to refer to any individual associated with code, including programmers, testers, managers, or other developer or viewer of code.

Contextual profile data can be determined by the contextual profile data determiner 222 based on an obtained contextual indicator(s). In this way, an indication of code, or portion thereof, and/or an individual associated therewith can be used to determine contextual profile data. Various types of contextual profile data may be determined. By way of example only, and without limitation, contextual profile data may include code modification data, designated response data, repository data, pull request data, push/pull command data, visual work item data, and/or the like.

Code modification data generally refers to any data related to code modification. Code modification data may include latest changes data and edit history data. Latest changes data can include an indication of a most recent change (e.g., a commit message or link thereto) associated with code or a code segment. A commit message generally refers to a message related to a commit operation which sends the latest changes of source code to a local repository, thereby making the changes part of a head or master revision of the repository. A commit message may include various types of data, such as a type of commit, a scope of commit, a subject, a body indicating or explaining changes made and reasons for the change, a footer indicating issues affected by the code changes or comments to another developer, etc. The contextual profile data determiner 222 may determine any type of information associated with the latest changes data, such as, for example, a link to a commit message, a time associated with the commit message, and a brief overview or summary of the commit change.

Latest change data may be determined in accordance with one or more obtained contextual indicators. As one example, based on obtaining a code indicator specifying a particular set of code, a latest change associated with the code may be identified. As another example, based on obtaining a code segment indicator specifying a particular segment of code (e.g., line of code), a latest change associated with the code may be identified. As yet another example, based on obtaining a developer indicator associated with a particular segment of code, a latest change associated with the developer may be identified. Such developer specific latest change data may be limited to data associated with the specific code or code segment, but need not be the case. For example, any latest change data associated with the developer may be identified (e.g., across different sets of code and/or code segments).

Edit history data can include data indicating edit history associated with code or a code segment. Edit history data may convey any type of edits and any number of edits, and/or links thereto. Edit history data may also include a date/time associated with an edit, a developer associated with an edit, etc. The contextual profile data determiner 222 may obtain any type of information associated with edit history data, such as, for example, a link to a previous modification, a date/time associated with a previous modification, a brief overview or summary of the previous modification, etc.

Edit history data may be determined in accordance with one or more obtained contextual indicators. As one example, based on obtaining a code indicator specifying a particular set of code, edit history data associated with the code may be determined. As another example, based on obtaining a code segment indicator specifying a particular segment of code, edit history data associated with the code segment may be identified. As yet another example, based on obtaining a developer indicator associated with a particular segment of code, edit history data associated with the developer may be identified. Such developer specific edit history data may be limited to data associated with the specific code or code segment, but need not be the case. For example, any edits associated with the developer may be identified (e.g., across different sets of code and/or code segments).

In some cases, code modification data (e.g., latest change data and/or edit history data) is identified via a local data source (e.g., a local repository). For example, upon obtaining a contextual indicator(s), code modification data associated with the contextual indicator(s) may be accessed or obtained via a data source local to a requesting user device. One example of such a data source includes Git® software and/or Git® repository. Git® includes software to track changes to sets of files during software development. A Git® repository can include a set of commit objects and a set of references to commit objects. The Git® repository may be stored in a same directory as the project itself. A commit object may include a set of files reflecting the state of the project at a point in time, references to parent commit objects, and a unique identifier of the commit object. Other types of information may additionally or alternatively be identified in association with a local Git® repository.

Designated response data generally refers to data associated with a designated response individual. A designated response individual is an individual that is designated or responsible for responding in relation to code, if needed. Designated response data may be desirable to a developer as a developer currently working on the code may desire to communicate with an individual managing that code portion. For instance, during off hours, a programmer may not be able to communicate with the individual that added or modified a code segment and, as such, may desire to communicate with the designated response individual to ask a question.

In some cases, a designated response individual may be an individual that is consistent over time. In other cases, a designated response individual may be an individual that changes over time. For example, for a first set of hours of each weekday, the designated response individual may be a first person; for a second set of hours each weekday, the designated response individual may be a second person; for a third set of hours each weekday, the designated response individual may be a third person; and for the weekend, the designated response individual may be a fourth person. The particular times associated with designated response individuals may be consistent over time, such as week-to-week, or may change over time (e.g., each week). The contextual profile data determiner 222 may obtain any type of information associated with designated response data, such as, for example, a unique identifier of the individual, contact information associated with the individual, time duration during which the individual is designated as the designated response individual, and/or the like.

Designated response data may be determined in accordance with one or more obtained contextual indicators. As one example, based on obtaining a code indicator specifying a particular set of code, designated response data associated with the code may be determined. As another example, based on obtaining a code segment indicator specifying a particular segment of code, designated response data may be identified. In some cases, a designated response individual may be a same person for an entire set of code. In other cases, a designated response individual may be a different individual for different segments of code. For example, a first individual may be a designated response individual for a first portion of code and a second individual may be a designated response individual for a second portion of code.

In some cases, designated response data can be determined via a data source having a list or index of individuals designated as designated response individuals and corresponding parameters (e.g., dates/times, code segments for which responsible, team data, etc.). Such a data source may be any data source, such as an incident management system (e.g., Microsoft® Azure® Incident Management System). Accordingly, based on obtained contextual indicators, the contextual profile data determiner 222 may communicate with a data source to identify appropriate designated response data. Such designated response data (e.g., a designated response individual) may be identified based on the code, the code segment, the developer associated with the code segment, and/or a corresponding time (e.g., a time at which the determination is being made such that real time data is provided).

As one example, assume a user selects a code segment or a programmer associated therewith (e.g., individual that last contributed to the code segment). In such a case, a team responsible for the code segment or a team on which the programmer is a member may be identified. Based on the identified team, a designated response individual may be identified in association with the current day/time (and other relevant data). In accordance with identifying the designated response individual, other designated response data may be identified, such as contact information associated with the individual.

Repository data generally refers to data associated with repositories. The contextual profile data determiner 222 may obtain any type of information associated with repository data, such as, for example, links to repositories, descriptions or summaries of repositories, metadata associated with repositories, time/date associated with repository access, modifications, contributions, build status (e.g., build succeeded, build failed, build in progress), and/or the like.

Repository data may be determined in accordance with one or more obtained contextual indicators. As one example, based on obtaining a code indicator specifying a particular code, repository data associated with the code may be determined. As another example, based on obtaining a code segment indicator specifying a particular segment of code, repository data associated with the code segment may be identified. As yet another example, based on obtaining a code indicator specifying a developer, repository data associated with the developer may be determined. That is, repositories that the developer has accessed or interacted with may be identified. Advantageously, providing repository data can facilitate contextualizing or understanding what an individual is working on or contributing to in terms of code (e.g., source code).

In some cases, repository data can be determined via a data source having remote or centralized information related to various coding projects. In this regard, the contextual profile data determiner 222 may access or make a call to a service that monitors or provides repository access, usage, etc. One example service is Microsoft's Azure® DevOps service that can monitor repository access. By way of example only, assume a user selects a line of code associated with a particular programmer (e.g., the programmer was the last to edit the line of code). Based on the particular programmer, a set of repositories accessed by the particular programmer may be identified by communicating with a remote service that monitors repository access (e.g., a centralized or remote repository, that is, not a local repository). For example, various remote or centralized repositories may be hosted via a cloud service (e.g., Microsoft's Azure®) and, as such, access to such repositories can be managed or monitored (e.g., via Azure® DevOps). Such communication with a remote service that monitors repository access may be via an Open Supervised Device Protocol (OSDP) or other protocol enabling communication over a network. Although this example identifies relevant repository data in relation to a developer, embodiments are not limited thereto. For example, the repository data may additionally or alternatively be associated with the particular code being viewed by the user and/or a particular code segment selected by the user.

Pull command data generally refers to data associated with pull commands, and push command data generally refers to data associated with push commands. In some cases, local repositories, such as a local repository at a user device, can be synchronized with a remote, centralized, or global repository, thereby enabling developers to synchronize changes with other developers. Such a synchronization can be performed using push and/or pull commands. Generally, a push command is used to push commits associated with a current local repository to a remote repository to a main branch, or some other development branch. For example, a push command can be used to push all commits of a local repository that belong to a master branch to a server having a global repository. A pull command is used to fetch the content or commits from a main branch or some other development branch of a remote repository and store them in a local repository. As such, to prevent a local copy of a repository from becoming stale, a pull command can be used to re-synchronize the local copy of the repository with the remote repository.

Pull request data generally refers to data associated with pull requests. Generally, a pull request is the process of merging code between branches in repositories. A pull request may refer to a collection of code changes that an individual or developer desires to merge into a main branch, thereby effectively implementing changes through to customers. The pull request may provide code changes in the form of a tree of folders or files indicating changes or modifications thereto. By way of example only, assume a developer creates a new local branch at a local computing device to create a new feature. The developer may develop and commit changes to the local branch and push the local branch to create a copy on a server, or remote repository. Thereafter, the developer may create a pull request to merge the changes from the new branch to the master branch. For instance, when viewing branches in Microsoft® Azure® DevOps in a browser portal, a developer may be prompted to create a pull request for a new branch (also referred to as source branch) into a master branch (also referred to as target branch). In some cases, reviewers and/or the developer may discuss changes, push new commits to create an update to the pull request, etc. Completing the pull request merges the changes into the master branch.

Pull/push command data and/or pull request data may be determined in accordance with one or more obtained contextual indicators. As one example, based on obtaining a code indicator specifying a particular code, pull request data associated with the code may be determined. As another example, based on obtaining a code segment indicator specifying a particular segment of code, pull request data associated with the particular code segment may be identified. As yet another example, based on obtaining a code indicator specifying a particular developer, pull request data associated with the developer may be determined. That is, pull requests that the developer has initiated may be identified. Advantageously, providing pull/push command data and/or pull request data enables identification of various pulls/push commands and/or pull requests initiated in association with code, or a portion thereof, or a developer.

In some cases, pull/push command data and/or pull request data can be determined via a data source having remote or centralized information related to various coding projects. In this regard, the contextual profile data determiner 222 may access or make a call to a service that monitors or provides pull/push commands and/or pull requests in association with remote or centralized repositories. One example service is Microsoft's Azure® DevOps service that can monitor repositories and commands and requests associated therewith. By way of example only, assume a user selects a line of code associated with a particular developer (e.g., the programmer was the last to edit the line of code). Based on the particular developer, a set of pull requests initiated by the particular developer may be identified by communicating with a remote service that monitors repository access (e.g., a centralized or remote repository, that is, not a local repository). For example, various remote or centralized repositories may be hosted via a cloud service (e.g., Microsoft's Azure®) and, as such, access to such repositories can be managed or monitored (e.g., via Azure® DevOps). Such communication with a remote service that monitors repository access may be via an Open Supervised Device Protocol (OSDP) or other protocol enabling communication over a network. Although this example identifies relevant pull request data in relation to a developer, embodiments are not limited thereto. For example, the pull request data may additionally or alternatively be associated with the particular code being viewed by the user and/or a particular code segment selected by the user.

Visual work item data generally refers to any work item having a visual representation. One example of a visual work item includes cards or tickets on kanban boards. A kanban board refers to a tool that can be used to implement kanban to manage work. Kanban boards visually depict work at various stages of a process using cards or tickets to represent work items and columns to represent each stage of a process. The contextual profile data determiner 222 may obtain any type of information associated with visual work item data, such as, for example, a link to a visual work item (e.g., a kanban card), a visual work item, descriptions or summaries of visual work items (e.g., titles of kanban card), metadata associated with visual work items, time/date associated with visual work item access, modification, contributions, and/or the like. Advantageously, such visual work item data can provide context that might be relevant to programmers, designers, testers, managers, etc. and, as such, may provide different types of information.

Visual work item data may be determined in accordance with one or more obtained contextual indicators. As one example, based on obtaining a code indicator specifying a particular code, visual work item data associated with the code may be determined. As another example, based on obtaining a code segment indicator specifying a particular segment of code, visual work item data associated with the particular code segment may be identified. As yet another example, based on obtaining a code indicator specifying a developer, visual work item data associated with the developer may be determined. That is, visual work item data, such as kanban cards, that the developer has initiated or has contributed to may be identified. Advantageously, providing visual work item data enables identification of various work items in association with code, or a portion thereof, or a developer.

In some cases, visual work item data can be determined via a data source having remote or centralized information related to various coding projects. In this regard, the contextual profile data determiner 222 may access or make a call to a service that monitors or provides visual work item data. One example service is Microsoft's Azure® DevOps service that can access kanban boards. By way of example only, assume a user selects a line of code associated with a particular developer (e.g., the developer was the last to edit the line of code). Based on the particular developer, a set of kanban cards initiated, or contributed to, by the particular developer may be identified by communicating with a remote service that monitors kanban board access (e.g., a centralized or remote repository, that is, not a local repository). For example, various remote or centralized kanban boards may be hosted via a cloud service (e.g., Microsoft's Azure®) and, as such, access to such kanban boards can be managed or monitored (e.g., via Azure DevOps). Such communication with a remote service that monitors kanban boards access may be via an Open Supervised Device Protocol (OSDP) or other protocol enabling communication over a network. Although this example identifies relevant visual work item data in relation to a developer, embodiments are not limited thereto. For example, the relevant visual work item data may additionally or alternatively be associated with the particular code being viewed by the user and/or a particular code segment selected by the user.

The contextual profile data determiner 222 may also obtain various other contextual profile data. For example, various other types of contextual profile data may be identified or determined by accessing other data sources.

In embodiments, the contextual profile data determiner 222 uses data logic 226 to determine contextual profile data. Data logic 226 may include rules, conditions, associations, classification models, or other criteria, to identify or predict contextual profile data. Data logic 226 may take different forms depending on the mechanism used to determine contextual profile data. For example, data logic 226 may comprise a statistical model, fuzzy logic, neural network, finite state machine, support vector machine, logistic regression, clustering, or machine-learning techniques, similar statistical classification processes, or combinations of these to identify contextual profile data.

In this regard, data logic 226 of the contextual profile data determiner 222 may determine which data to determine, an extent of data, to what the particular contextual profile data is related (e.g., which contextual indicators to use to determine contextual profile data), etc. The contextual profile data determined, via logic 226, may be based on any type of data including obtained contextual indicators, the specific user to view the contextual profile data, and/or other types of data (e.g., date/time, settings/programming, etc.).

As described, the data logic 226 of the contextual profile data determiner 222 may determine a particular type of contextual profile data. For example, in some cases, the contextual profile data determiner 222 may determine pull request data and repository data. In other cases, the contextual profile data determiner 222 may determine push command data and visual work item data. The particular type of contextual profile data determined may be based on user preferences, default settings, logic, obtained contextual indicators, etc. For example, in cases that a viewer or user is a manager, a different type(s) of contextual profile data may be determined than if the viewer or user is a programmer or tester.

The contextual profile data determiner 222 may also determine to what the particular contextual profile data is related. By way of example only, in cases in which a developer indicator is obtained, contextual profile data specific to the developer may be determined. For instance, in determining pull request data, pull requests initiated by the developer may be determined (e.g., for a particular code or across codes). On the other hand, in cases in which a developer indication is not obtained, contextual profile data related to pull requests may include pull requests associated with a code or code segment. In this way, the contextual profile data determining 222 may determine contextual profile data related to the developer, code, code segment, date/time, and/or the like. Such a determination may be based on user preferences, user attributes, default settings, logic, obtained contextual indicators, etc.

The contextual profile data determiner 222 may also determine an amount or extent of data to determine. For example, for a particular type of contextual profile data, a predetermined number of data points may be determined. For example, assume pull request data is being determined in association with code and/or a developer. In such a case, the contextual profile data determiner 222 may determine a top five pull requests or a five most recent pull requests. Such a determination may be based on user preferences, user attributes, default settings, logic, obtained contextual indicators, and/or the like.

The profile data provider 224 is generally configured to provide contextual profile data. In this regard, upon determining contextual profile data, the profile data provider 224 can provide such data for display, for example via a user device. To this end, in cases in which the profile manager 212 is remote from the user device, the profile data provider 224 may provide contextual profile data to a user device for display to a user that initiated the request for viewing profile data.

Contextual profile data may be provided for display in any number of ways. In some cases, contextual profile data may be provided in the form of a profile card. In this regard, the profile data provider 224 may be configured to generate a profile card, or data associated therewith. A profile card generally refers to a card, window, or display portion that includes information associated with an individual or entity. A profile card may be presented as integrated with a window in which code is being presented on a display screen or presented as a window separate from the window presenting the code. In embodiments, the profile card may be presented concurrently with the code.

A profile card may include any type of information, including contextual profile data. As can be appreciated, in addition to contextual profile data, a profile card may include user data, organizational data, conversation data, etc. User data may include information about the user and ways to communicate with the user. For example, user data may include a user name, a profile image, office location, email address, phone number, job title, office location, etc. Organizational data may include organization directory, structure, etc. Conversation data may include various messages associated with conversations or instant messages. Various types of information may be included in different portions of the profile card.

In some embodiments, the profile data provider 224 may generate a profile card that includes a default set of information. In this way, the profile cards are generally structured in a similar manner. In other embodiments, the profile data provider 224 may use card logic 228 to dynamically determine a structure for the profile card. For example, card logic 228 may be used to determine which aspects of information to present, an order in which to present information, an extent of information to present, and/or the like. Card logic 228 may include rules, conditions, associations, classification models, or other criteria, to identify arrangement or presentation of profile data within a profile card. Card logic 228 may take different forms depending on the mechanism used to determine data arrangement or layout. For example, card logic 228 may comprise a statistical model, fuzzy logic, neural network, finite state machine, support vector machine, logistic regression, clustering, or machine-learning techniques, similar statistical classification processes, or combinations of these to identify arrangement of profile data.

By way of example only, assume contextual profile data determiner 222 determines 20 pull requests, 12 repository accesses, and 25 relevant visual work item data. In such a case, card logic 228 may determine which of the types of contextual profile data to provide in the card and an extent of each type to present. For instance, the card logic 228 may determine to present five pull requests, five repository accesses, and ten relevant visual work item data. Such a determination may be based on user preferences, a user viewing the data, a size of display screen on which the card is being presented, a proportion of data identified (e.g., 10% of identified contextual data for a particular type of contextual data), a historical viewing or access of data by the user viewing the data, a recency of data (e.g., data associated with the last week, a predetermined number of most recent data), etc.

The profile data provider 224 may provide contextual profile data in any number of ways. Further, profile data provider 224 may provide various data visualizations for presentation to users, only some of which are described herein. The particular utilization and/or visualizations implemented via the profile data provider 224 may be configured in any number of ways. In some cases, providing contextual profile data (e.g., via profile cards) may be customized or specific to a consumer of the information (e.g., a user).

The contextual profile data 230 can be provided as output from the profile manager 212. As described, the contextual profile data 230 may be provided in the form of a profile card for display via a user device. Alternatively or additionally, the contextual profile data 230 can be provided to the data store 214 and/or other service or system.

Exemplary Implementations for Providing Contextual Profile Data

FIGS. 3-6 provide example graphical user interfaces that illustrate various aspects of embodiments described herein. As shown in FIG. 3, FIG. 3 provides an example source code 302 being developed by any number of developers. Assume a user (e.g., a programmer or manager) is viewing the source code 302. Further assume the user selects or hovers over a portion of the code, such as line 3 304. In such a case, a developer indicator 306 associated with the selected code portion 304 is presented. Now assume the user selects or hovers over the developer indicator 306.

Figure 4:
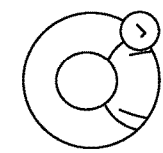
FIG. 4 provides a graphical user interface including an example profile card presented in connection with example source code, in accordance with embodiments of the present technology.

In such a case, a profile card 310 is presented, as illustrated in FIG. 4. As shown, the profile card 310 is provided for "John Smith," the developer associated with the selected portion of code. The profile card is presented concurrently with the source code 302. The profile card 310 includes user data including user data such as the user name, user profile image, and contact information. The profile card 310 includes icons 312 enabling the user to initiate communication with "John Smith" via various methods such as a phone or video call, an email, an instant message, etc.

Figure 5:
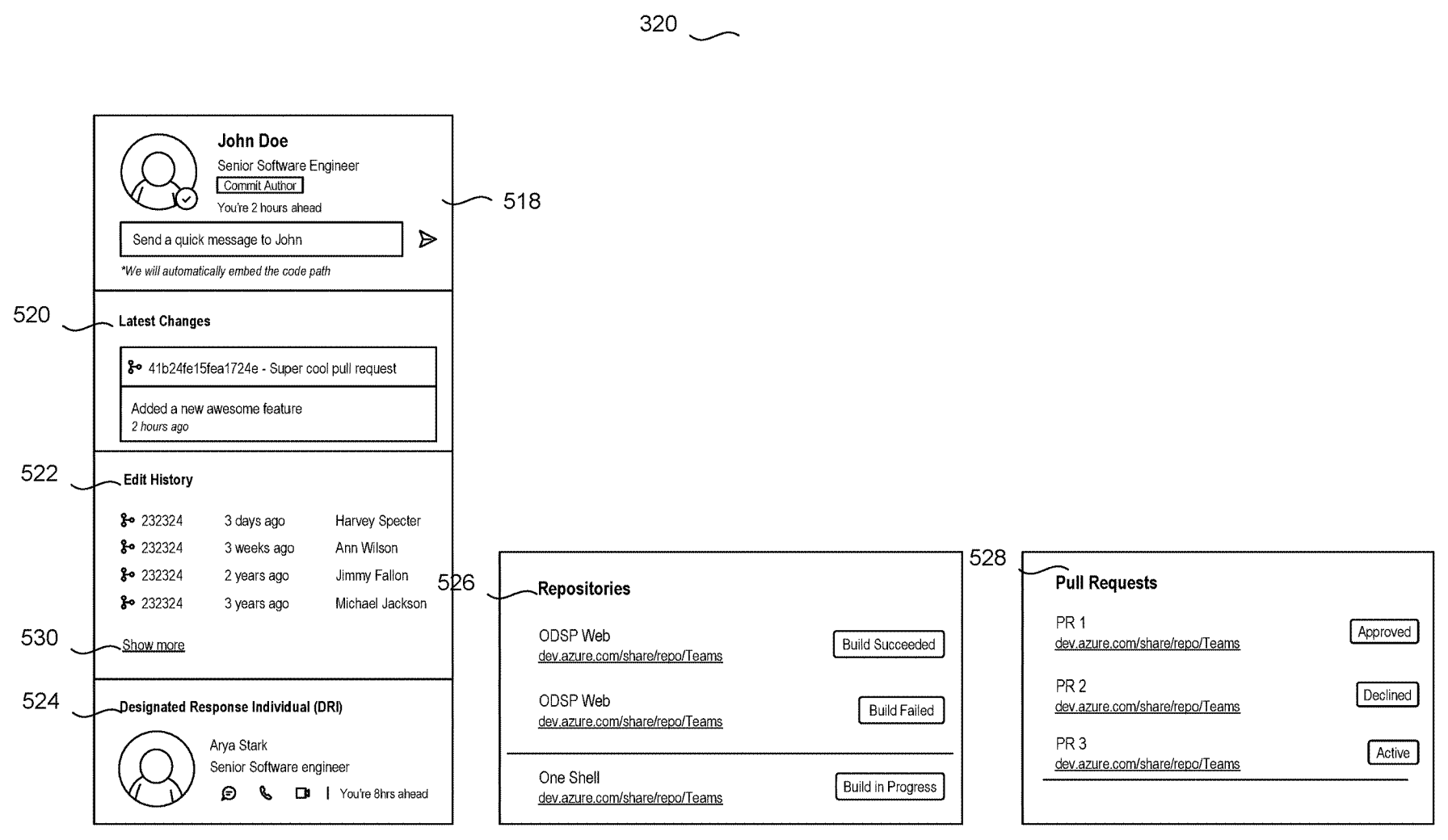

Turning to FIG. 5, FIG. 5 provides various types of contextual profile data that may be included in a profile card. Such contextual profile data may be presented in the initial presentation of the profile card 518 or by selecting or linking to such information via the profile card 310. In this example, contextual profile data includes latest changes data 520, edit history 522, designated response data 524, repository data 526, and pull request data 528. The latest changes data 520 includes data associated with a latest change, for example, associated with John Doe, source code 302, and/or code segment 304. The edit history 522 includes data associated with edits. The edit history includes links to the edits, the time duration since the edit, and the developer associated with the edit. As shown, a user may select the show more icon 530 to view additional edits. In this example, the edits are associated with different developers, but may be edits associated with the code. The designated response data 524 includes data associated with the designated response individual. In this example, the designated response individual is listed along with communication icons which, if selected, can be used to initiate communication with the designated response individual (e.g., via text messages, video calls, phone calls, emails, instant messages, etc.). The repository data 526 includes data associated with repository access. The repository data may indicate the specific repository accessed and the status of the repository (e.g., build succeeded, build failed, build in progress, etc.). The pull request data 528 includes data associated with pull requests. In this example, the pull request data includes a link to the pull request and the status of the pull request (e.g., approved, declined, active, etc.). Although the repository data 526 and pull request data 528 are illustrated separate, such data may be shown concurrently within the profile card initially, upon scrolling within the profile card, or upon selecting a link to view additional data.

Figure 6:
FIG. 6 provides a graphical user interface including another example profile card, in accordance with embodiments of the present technology.

FIG. 6 illustrates additional data that may be shown in association with a profile card. This example profile card includes user data 602, organizational data 604, file data 606, conversation data 608, and social media data 610. In this example, various contextual profile data can be included in this example by selecting code-related data icon 612.

Figure 7:
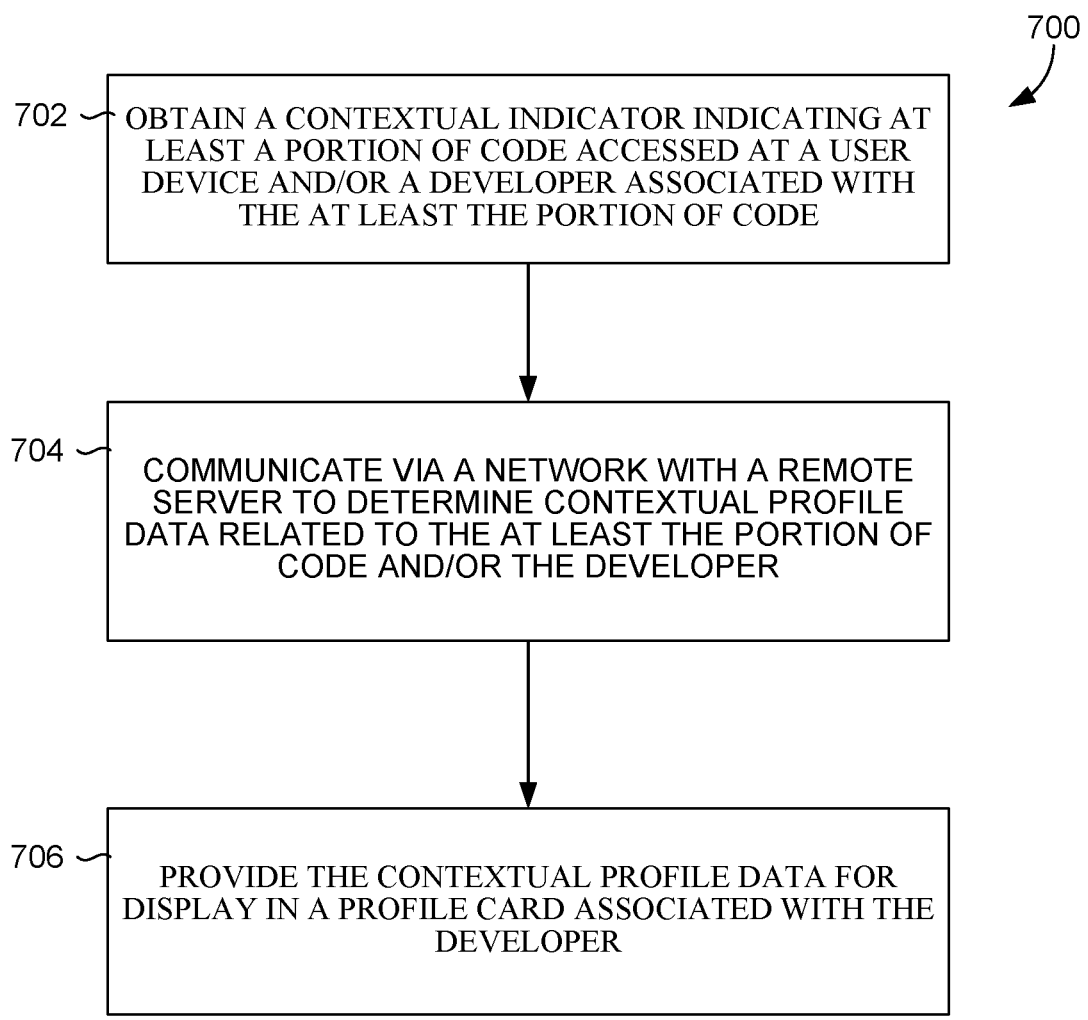
FIG. 7 provides a first example method for facilitating provision of contextual profile data, in accordance with aspects of the technology described herein.
Figure 8:
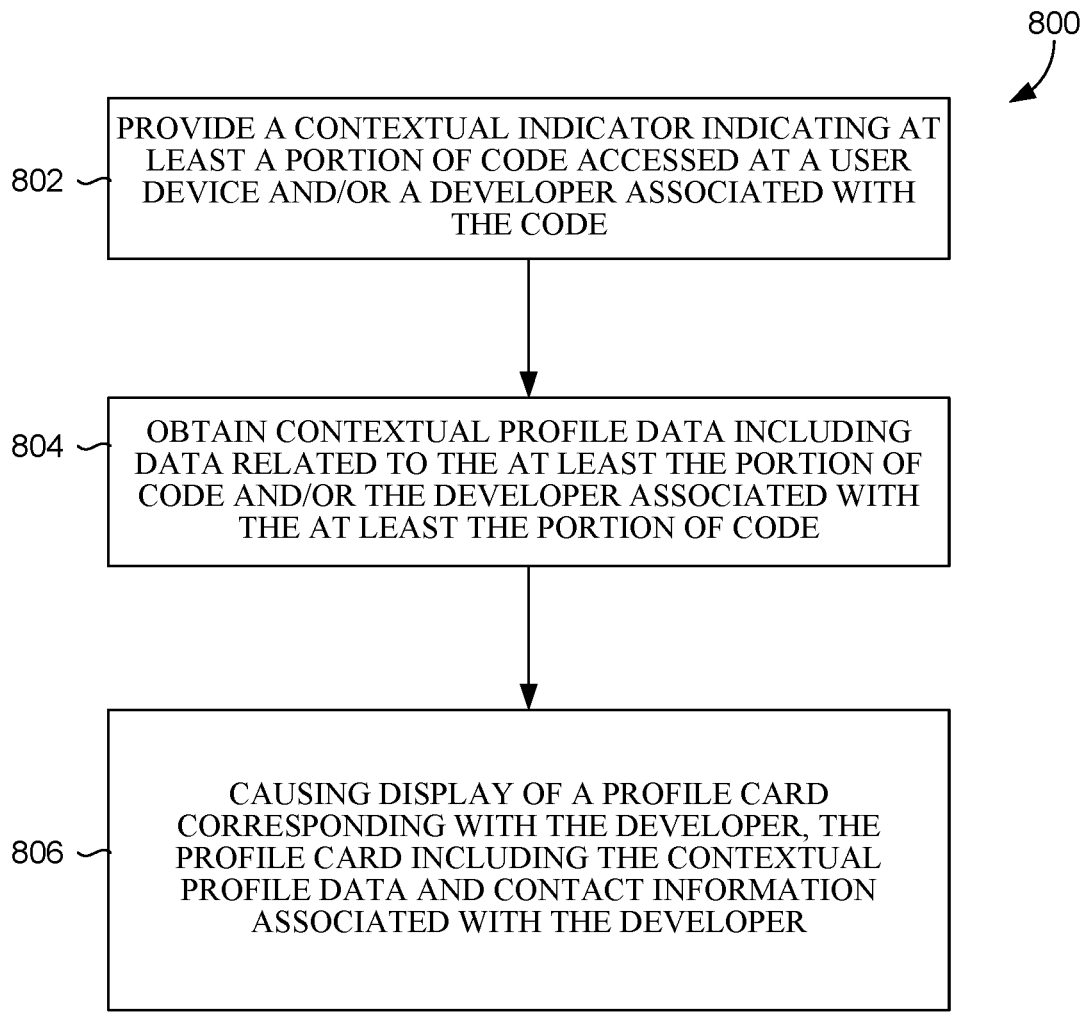
FIG. 8 provides a second example method for facilitating provision of contextual profile data, in accordance with aspects of the technology described herein.
Figure 9:
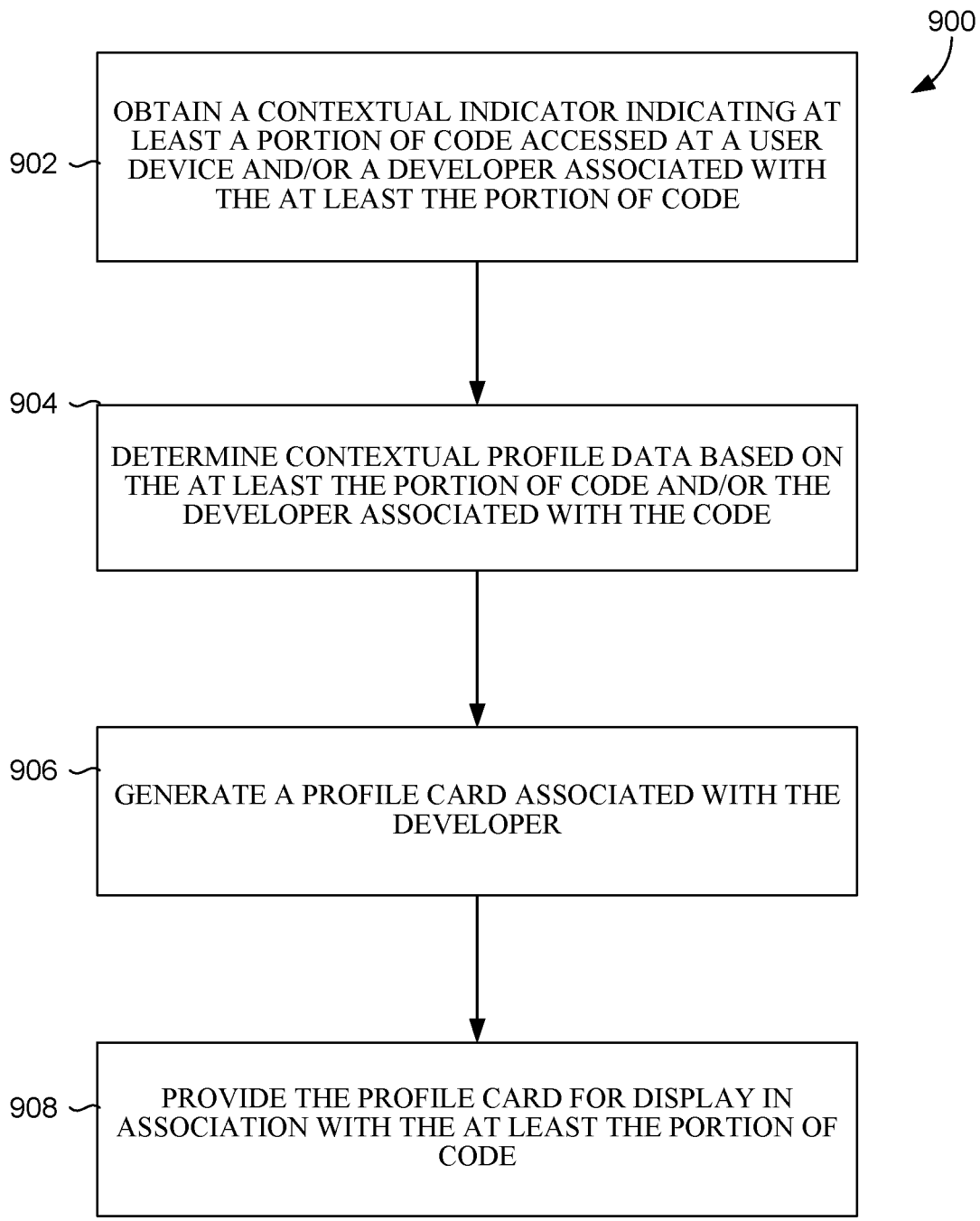
FIG. 9 provides a third example method for facilitating provision of contextual profile data, in accordance with aspects of the technology described herein.

As described, various implementations can be used in accordance with embodiments described herein. FIGS. 7-9 provide methods of facilitating providing contextual profile data, in accordance with embodiments described herein. The methods 700, 800, and 900 can be performed by a computer device, such as device 1000 described below. The flow diagrams represented in FIGS. 6-9 are intended to be exemplary in nature and not limiting.

Turning initially to method 700 of FIG. 7, method 700 is directed to facilitating provision of contextual profile data, in accordance with embodiments of the present technology. Initially, at block 702, a contextual indicator indicating at least a portion of code accessed at a user device and/or a developer associated with the at least the portion of code is obtained. The contextual indicator may be obtained in response to a user selecting the at least the portion of code or an indication of the developer associated with the code (e.g., a most recent individual to contribute to the portion of the code). At block 704, based on the contextual indicator, contextual profile data related to the at least the portion of code and/or the developer is determined by communicating via a network with a remote server having a global repository including the at least the portion of code. Such contextual profile data may include repository data, pull request data, designated response data, visual work item data, and/or the like. At block 706, the contextual profile data is provided for display in a profile card associated with the developer. The profile card may include other data corresponding with the developer, such as contact information for the developer, organizational data, etc.

Turning now to FIG. 8, method 800 is directed to causing presentation of contextual profile data, in accordance with embodiments of the present technology. Initially, at block 802, a contextual indicator indicating at least a portion of code accessed at a user device and/or a developer associated with the code is provided. Such a contextual indicator may be provided based on a user selection associated with a set of code presented via a code developing application. At block 804, contextual profile data including data related to the at least the portion of code and/or the developer associated with the at least the portion of code is obtained. Such contextual profile data may be determined using contextual indicator. At block 806, a profile card corresponding with the developer is caused to be displayed, via a graphical user interface, within the code developing application. Such a profile card including the contextual profile data and contact information associated with the developer.

With reference now to FIG. 9, method 900 is directed to facilitating provision of contextual profile data, in accordance with embodiments of the present technology. Initially, at block 902, a contextual indicator indicating at least a portion of code accessed at a user device and/or a developer associated with the at least the portion of code is obtained. At block 904, contextual profile data is determined based on the at least the portion of code and/or the developer associated with the at least the portion of code. Such contextual profile data may be determined based on accessing a remote data source that hosts a global repository including the at least the portion of code. At block 906, a profile card associated with the developer is generated. The profile card can include the contextual profile data and contact information associated with the developer, among other data. Thereafter, at block 908, the profile card is provided for display in association with the least the portion of code. In this regard, the profile card can be concurrently displayed with the code, for example, via a single window or via separate windows.

Accordingly, we have described various aspects of technology directed to systems, methods, and graphical user interfaces for intelligently determining and providing contextual profile data. It is understood that various features, sub-combinations, and modifications of the embodiments described herein are of utility and may be employed in other embodiments without reference to other features or sub-combinations. Moreover, the order and sequences of steps shown in the example methods 700, 800, and 900 are not meant to limit the scope of the present disclosure in any way, and in fact, the steps may occur in a variety of different sequences within embodiments hereof. Such variations and combinations thereof are also contemplated to be within the scope of embodiments of this disclosure.

In some embodiments, a computerized system, such as the computerized system described in any of the embodiments above, comprises one or more processors, and one or more computer storage media storing computer-useable instructions that, when executed by the one or more processors, cause the one or more processors to perform operations. The operations comprise obtaining a contextual indicator indicating at least a portion of code accessed at a user device and/or a developer associated with the at least the portion of code. The operations may further comprise based on the contextual indicator, communicating via a network with a remote server having a global repository including the at least the portion of code to determine contextual profile data related to the at least the portion of code and/or the developer. The operations may further comprise providing the contextual profile data for display in a profile card associated with the developer. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and providing contextual profile data. Further, in this way, embodiments, as described herein, cause certain, contextual profile data related to computer code to be programmatically surfaced and presented without requiring a computer tools and resources for a user to manually perform operations to produce this outcome.

In any combination of the above embodiments of the computerized system, the profile card is presented concurrently with the least the portion of code at the user device.

In any combination of the above embodiments of the computerized system, the profile card provides contact data associated with the developer.

In any combination of the above embodiments of the computerized system, the contextual profile data comprises designated response data including at least an indication of an individual that is designated or responsible for responding in relation to the at least the portion of code.

In any combination of the above embodiments of the computerized system, the designated response data is determined based on at least one of a code indicator, a code segment indicator, or a developer indicator.

In any combination of the above embodiments of the computerized system, the contextual profile data comprises repository data including data associated with one or more repositories.

In any combination of the above embodiments of the computerized system, the repository data is determined based on at least one of a code indicator, a code segment indicator, or a developer indicator.

In any combination of the above embodiments of the computerized system, the contextual profile data comprises pull request data including data associated with pull requests.

In any combination of the above embodiments of the computerized system, the pull request data is determined based on at least one of a code indicator, a code segment indicator, or a developer indicator.

In any combination of the above embodiments of the computerized system, the contextual profile data comprises visual work item data including data associated with a card on a kanban board.

In other embodiments, a computer-implemented method is provided. The method includes comprise based on a user selection associated with a set of code presented via a code developing application, providing a contextual indicator indicating at least a portion of code accessed at a user device and/or a developer associated with the at least the portion of code. The method may further include obtaining contextual profile data including data related to the at least the portion of code and/or the developer associated with the at least the portion of code. The method may further include causing display, via a graphical user interface, of a profile card within the code developing application, the profile card corresponding with the developer and including the contextual profile data and contact information associated with the developer. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and providing contextual profile data. Further, in this way, embodiments, as described herein, cause certain, contextual profile data related to computer code to be programmatically surfaced and presented without requiring a computer tools and resources for a user to manually perform operations to produce this outcome.

In any combination of the above embodiments of the computer-implemented method, the user selection comprises a selection of the at least the portion of code.

In any combination of the above embodiments of the computer-implemented method, the contextual profile data comprises designated response data, pull request data, visual work item data, and/or repository data.

In any combination of the above embodiments of the computer-implemented method, the contextual profile data is determined by communicating with a remote service that hosts at least one global repository including the set of code.

In any combination of the above embodiments of the computer-implemented method, the remote service manages a plurality of repositories and a plurality of kanban boards having visual work items.

In other embodiments, one or more computer storage media having computer-executable instructions embodied thereon that, when executed by one or more processors, cause the one or more processors to perform a method is provided. The method includes obtaining a contextual indicator indicating at least a portion of code accessed at a user device and/or a developer associated with the at least the portion of code. The method also includes determining contextual profile data based on the at least the portion of code and/or the developer associated with the at least the portion of code. The method further includes generating a profile card associated with the developer, the profile card including the contextual profile data and contact information associated with the developer. The method further includes providing the profile card for display in association with the least the portion of code. In this way, embodiments of this disclosure enable an improved user experience across a number of computer devices, applications and platforms. Also in this way, embodiments, as described herein, enable very large scale of operations created by software-based services that cannot be managed by humans to operate in an efficient manner while determining and providing contextual profile data. Further, in this way, embodiments, as described herein, cause certain, contextual profile data related to computer code to be programmatically surfaced and presented without requiring a computer tools and resources for a user to manually perform operations to produce this outcome.

In any combination of the above embodiments of the media, the profile card is displayed concurrently with the least the portion of code.

In any combination of the above embodiments of the media, the contextual profile data comprises one or more of designated response data, pull request data, visual work item data, and/or repository data corresponding with the developer.

In any combination of the above embodiments of the media, the contextual profile data comprises one or more of designated response data, pull request data, visual work item data, and/or repository data corresponding with the at least the portion of code.

In any combination of the above embodiments of the media, the method further comprises based on a selection via the profile card to communicate with the developer, initiating real-time communication with the developer.

Overview of Exemplary Operating Environment

Having briefly described an overview of aspects of the technology described herein, an exemplary operating environment in which aspects of the technology described herein may be implemented is described below in order to provide a general context for various aspects of the technology described herein.

Figure 10:
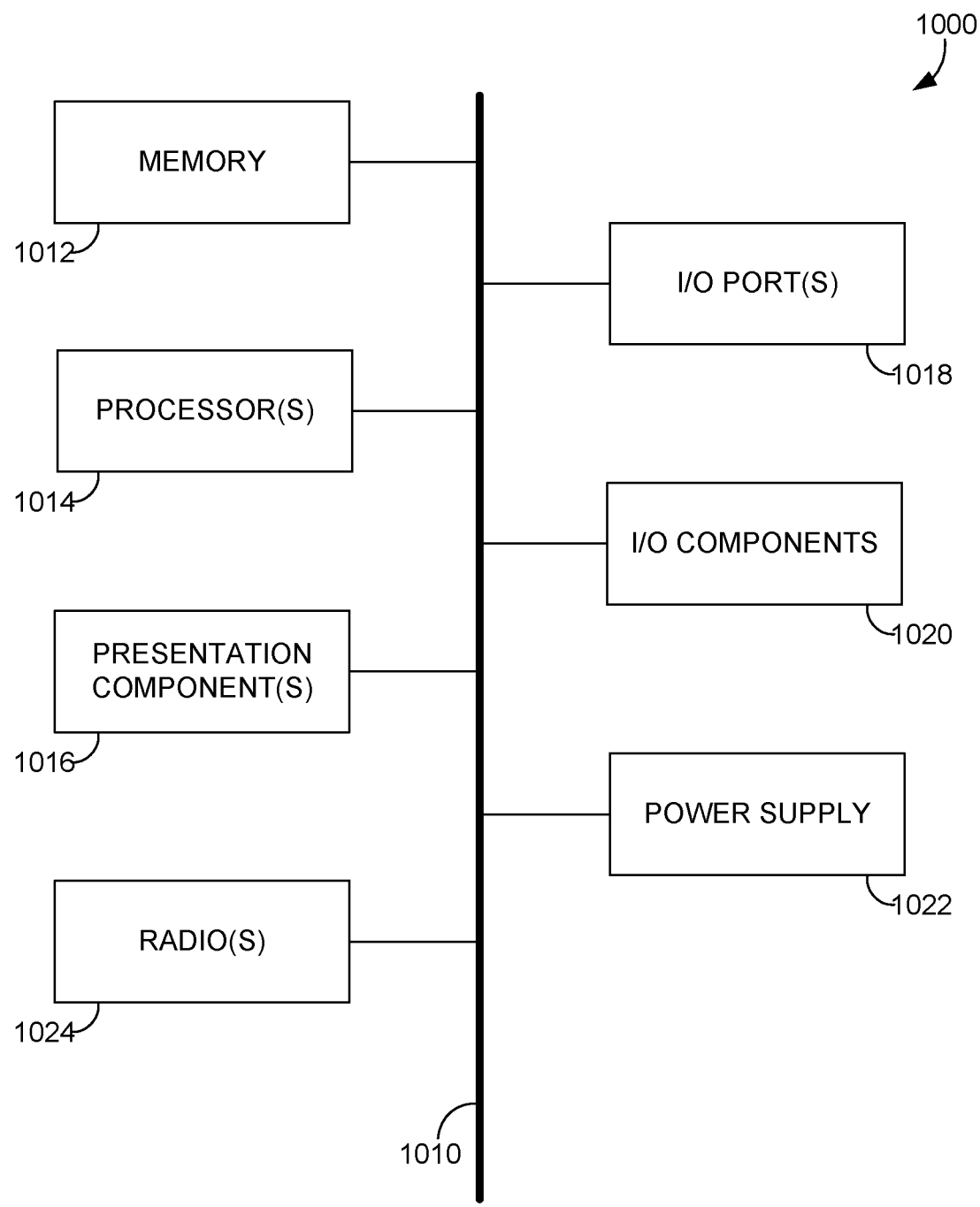
FIG. 10 is a block diagram of an exemplary computing environment suitable for use in implementing aspects of the technology described herein.

Referring to the drawings in general, and to FIG. 10 in particular, an exemplary operating environment for implementing aspects of the technology described herein is shown and designated generally as computing device 1000. Computing device 1000 is just one example of a suitable computing environment and is not intended to suggest any limitation as to the scope of use or functionality of the technology described herein. Neither should the computing device 1000 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 10, computing device 1000 includes a bus 1010 that directly or indirectly couples the following devices: memory 1012, one or more processors 1014, one or more presentation components 1016, input/output (I/O) ports 1018, I/O components 1020, an illustrative power supply 1022, and a radio(s) 1024. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 10 is merely illustrative of an exemplary computing device that can be used in connection with one or more aspects of the technology described herein. Distinction is not made between such categories as "workstation," "server," "laptop," and "handheld device," as all are contemplated within the scope of FIG. 10 and refer to "computer" or "computing device."

Computing device 1000 typically includes a variety of computer-readable media. Computer-readable media can be any available media that can be accessed by computing device 1000 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1012 includes computer storage media in the form of volatile and/or nonvolatile memory. The memory 1012 may be removable, non-removable, or a combination thereof. Exemplary memory includes solid-state memory, hard drives, and optical-disc drives. Computing device 1000 includes one or more processors 1014 that read data from various entities such as bus 1010, memory 1012, or I/O components 1020. Presentation component(s) 1016 present data indications to a user or other device. Exemplary presentation components 1016 include a display device, speaker, printing component, and vibrating component. I/O port(s) 1018 allow computing device 1000 to be logically coupled to other devices including I/O components 1020, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1014 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1000. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1000. The computing device 1000 may be equipped with depth cameras, such as stereoscopic camera systems, infrared camera systems, RGB camera systems, and combinations of these, for gesture detection and recognition. Additionally, the computing device 1000 may be equipped with accelerometers or gyroscopes that enable detection of motion. The output of the accelerometers or gyroscopes may be provided to the display of the computing device 1000 to render immersive augmented reality or virtual reality.

A computing device may include radio(s) 1024. The radio 1024 transmits and receives radio communications. The computing device may be a wireless terminal adapted to receive communications and media over various wireless networks. Computing device 1000 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein has been described in relation to particular aspects, which are intended in all respects to be illustrative rather than restrictive.

What is claimed is:

1. A computing system comprising:
a processor; and
computer storage memory having computer-executable instructions stored thereon which, when executed by the processor, configure the computing system to:
receive, through a user interface of a code development application, user input selecting at least a portion of code being displayed on the user interface; and
in response to receipt of the user input:
communicate a contextual indicator associated with the portion of code to a global repository residing on a remote server
receive, from the global repository, contextual profile data related to the portion of code, the contextual profile data including contact information for a developer associated with the portion of code; and
concurrently display, within the user interface of the code development application, the portion of code and a profile card including the contact information for the developer associated with the portion of code.

2. The computing system of claim 1, wherein the contextual profile data further includes push/pull command data and the push/pull command data is presented on the profile card.

3. The computing system of claim 1, wherein the contextual profile data further includes code modification data and the code modification data is presented on the profile card.

4. The computing system of claim 1, wherein the contextual profile data comprises designated response data including at least an indication of an individual that is designated to respond to inquiries pertaining to the portion of code.

5. The computing system of claim 4, wherein the designated response data is determined based on the portion of code selected by the user input.

6. The computing system of claim 1, wherein the contextual profile data comprises repository data indicating one or more repositories that the portion of code resides in and status information for the one or more repositories.

7. The computing system of claim 6, further comprising:
in response to receipt of the user input, presenting a developer indicator identifying a developer associated with the portion of code; and
presenting the profile card in response to receipt of user input selecting the developer indicator.

8. The computing system of claim 1, wherein the contextual profile data comprises visual work item data including data associated with a card on a kanban board, and the visual work item data is presented in the profile card.

9. A computer-implemented method comprising:
receiving, through a user interface of a code development application, a user selection of a portion of code being presented on the user interface;
in response to receipt of the user selection of the portion of code:
obtaining, from a repository, contextual profile data including data related to the portion of code, the contextual profile data including contact information for a developer associated with the portion of code; and
concurrently displaying, within the user interface of the code development application, the portion of code and a profile card including the contact information for the developer associated with the portion of code.

10. The method of claim 9, further comprising:
in response to receipt of the user selection of the portion of code, presenting a developer indicator identifying a developer associated with the portion of code; and
presenting the profile card in response to receipt of user input selecting the developer indicator.

11. The method of claim 9, wherein the contextual profile data comprises designated response data, pull request data, visual work item data, and/or repository data that is presented in the profile card.

12. The method of claim 11, wherein the contextual profile data is determined by communicating with a remote service that hosts at least one global repository including storing a code product that includes the portion of code.

13. The method of claim 12, wherein the remote service manages a plurality of repositories and a plurality of kanban boards having visual work items.

14. One or more computer storage media having computer-executable instructions embodied thereon that, when executed by one or more processors, cause the one or more processors to perform a method, the method comprising:
receive, through a user interface of a code development application, user input selecting a portion of code included within a code product displayed on the user interface of the code development application;
in response to receipt of the user input selecting the portion of code:
determining contextual profile data based on the at least the portion of code, the contextual profile data including contact information for a developer associated with the portion of code;
generating a profile card associated with the developer, the profile card including the contextual profile data and the contact information associated with the developer; and
concurrently displaying the portion of code and a profile card including the contact information for the developer associated with the portion of code.

15. The media of claim 14, wherein contextual profile data further includes push/pull command data and the push/pull command data is presented on the profile card.

16. The media of claim 14, wherein the contextual profile data comprises code modification data and the code modification data is presented on the profile card.

17. The media of claim 14, wherein the method further comprises:
in response to receipt of the user selection of the portion of code, presenting a developer indicator identifying a developer associated with the portion of code; and
presenting the profile card in response to receipt of user input selecting the developer indicator.

18. The media of claim 14, wherein based on a selection via the profile card to communicate with the developer, initiating real-time communication with the developer.

* * * * *